US012346911B2

(12) United States Patent
Hatter et al.

(10) Patent No.: US 12,346,911 B2
(45) Date of Patent: Jul. 1, 2025

(54) SYSTEM AND METHOD FOR DISTRIBUTED ON-LINE TRANSACTIONS UTILIZING A CLEARING HOUSE

(71) Applicant: AYIN INTERNATIONAL INC., Corona, CA (US)

(72) Inventors: Jesse Andrew Hatter, Corona, CA (US); Brenda Faye Hatter, Corona, CA (US); Anthony Lionel Jackson, Corona, CA (US); Curtis Allen Patton, Monterey Park, CA (US); Linton Wiley, Perris, CA (US); Gene Wiley, Perris, CA (US); Edward Ederaine, Corona, CA (US)

(73) Assignee: AYIN INTERNATIONAL INC., Corona, CA (US)

( * ) Notice: Subject to any disclaimer, the term of this patent is extended or adjusted under 35 U.S.C. 154(b) by 0 days.

(21) Appl. No.: 17/792,155

(22) PCT Filed: Jan. 21, 2021

(86) PCT No.: PCT/US2021/014333
§ 371 (c)(1),
(2) Date: Jul. 12, 2022

(87) PCT Pub. No.: WO2021/150693
PCT Pub. Date: Jul. 29, 2021

(65) Prior Publication Data
US 2023/0109761 A1    Apr. 13, 2023

Related U.S. Application Data

(60) Provisional application No. 62/965,273, filed on Jan. 24, 2020.

(51) Int. Cl.
*G06Q 30/018*   (2023.01)
*G06Q 20/02*   (2012.01)
(Continued)

(52) U.S. Cl.
CPC ......... *G06Q 30/018* (2013.01); *G06Q 20/023* (2013.01); *G06Q 20/3825* (2013.01); *H04L 63/0884* (2013.01)

(58) Field of Classification Search
None
See application file for complete search history.

(56) References Cited

U.S. PATENT DOCUMENTS

| 8,190,904 B2 | 5/2012 | Hatter et al. |
| 2010/0138904 A1 | 6/2010 | Anguiano Jimenez |
| (Continued) | | |

FOREIGN PATENT DOCUMENTS

WO    WO-2017096399 A1 *   6/2017   ......... G06Q 20/3672

OTHER PUBLICATIONS

Vance Jr., Cyrus R. "Report of the Grand Jury of the Supreme Court State of New York First Judicial District Issued Pursuant to Criminal Procedure Law Section 190.85 Subdivision (1)(c)" Published by the The Grand Jury of the Supreme Court of the State of New York County of New York 2018.

*Primary Examiner* — Narayanswamy Subramanian
(74) *Attorney, Agent, or Firm* — David Todd Shoneman; Michael A. Pugel

(57) ABSTRACT

Methods, apparatuses and systems are defined for the use of a clearinghouse device in conjunction with remote online signature validation for signature validated or notarized electronic documents. The clearinghouse applies machine learning techniques to generate one or more verification and validation scores associated with signature validation using identification elements and information supplied by a signatory of the electronic document. The verification and validation scores are used to confirm proper execution of the signature validation and generate an electronic signature validation or notarization on the electronic documents.

12 Claims, 4 Drawing Sheets

(51) Int. Cl.
*G06Q 20/38* (2012.01)
*H04L 9/40* (2022.01)

(56) References Cited

U.S. PATENT DOCUMENTS

| | | |
|---|---|---|
| 2012/0016800 A1 | 1/2012 | Stewart et al. |
| 2013/0303275 A1 | 11/2013 | Mathews |
| 2015/0341370 A1* | 11/2015 | Khan ................ H04L 63/20 |
| | | 726/30 |
| 2017/0004507 A1* | 1/2017 | Henderson ............ G06Q 20/20 |
| 2017/0024576 A1 | 1/2017 | Kinsel et al. |
| 2019/0319948 A1 | 10/2019 | Triola et al. |
| 2020/0211075 A1* | 7/2020 | Kumar ................ G06F 3/0346 |
| 2020/0349242 A1* | 11/2020 | Gonser, Jr. .......... H04L 63/1425 |

\* cited by examiner

SYSTEM AND METHOD FOR DISTRIBUTED ON-LINE TRANSACTIONS UTILIZING A CLEARING HOUSE

This application claims the benefit, under 35 U.S.C. § 365 of International Application PCT/US/2021/014333, filed Jan. 21, 2021, which was published in accordance with PCT Article 21(2) on Jul. 29, 2021, in English and which further claims the benefit of US Provisional Application U.S. 62/965,273 filed on Jan. 24, 2020.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

Witnessing is a primary intelligent activity required to be executed during a Notarial act. Some elements that should be met before one acts as a witness include, being a person of superior intellect, having mental soundness, having the ability to relate seemingly disparate things, and having the astuteness of perception or judgment.

Some of the accepted realities in today's economy include the increased likelihood of relocation, the retention of relationships with remote or on-line financial institutions, embracing eCommerce transactions and the acceptance that an alternative to the current, and sometimes required, in-person face-to-face transaction is needed. Currently, manual notarization requires the "physical" personal appearance of the signer before a duly sworn commissioned notary public, often referred to as a notary. The present in-person notarial act requirements include, but are not limited to the appearance of the signer in front of the notary public to execute documents face to face, the notary public successfully assessing the signer for awareness, duress, and volition, and the notary public properly examining and confirming the signer's identification document. The requirements also usually include the requirements that the notary must witness the signer affixing their signature, the notary signing and affixing their official seal to a certificate such as an acknowledgement form, jurat, or affidavit, the notary recording the notarial act or transaction in a personal notary journal, and collecting any fees, as allowed, for performing the notarial act or transaction.

A virtual notary deals with offering a modified alternative to the traditional notarization process defined above. The Electronic Signatures in Global and National Commerce Act (E-SIGN), coupled with the State level mandated and enacted Uniform Electronic Transaction Act (UETA), set forth the need to identify and develop implementations to allow for secure virtual notary transactions. There are two cornerstone rules that underlie the notarization process. The first is that the fundamental principles of the traditional notarization must remain the same regardless of the technology used to create a signature. The second is technology neutrality.

A growing number of approaches to handling non-notarial e-commerce transactions have been introduced in recent years. For instance, in the financial ecosystem, a clearinghouse is often used as an intermediary between buyers and sellers of financial instruments. Clearinghouses take the opposite position of each side of a trade. In such situations, clearinghouses exist to ensure the smooth functioning of financial markets. Fewer transactions would take place if sellers were worried that buyers would refuse to pay them, and vice versa. A clearinghouse ensures that transactions happen as planned.

For example, if a first person agrees to sell 100 shares of Company XYZ to a second person for $10,000, the clearinghouse ensures that the second person is delivered the 100 shares and the first person is delivered $10,000. The clearinghouse also records and reports the transaction to everyone involved in an accurate and timely manner.

Computerization, telephones, and the Internet have electronically connected consumers and account holders with a variety of products and services provided by merchants and service providers such as banks, financial institutions, governmental authorities, insurance companies and medical service providers. For example, banks provide account holders with electronic access to their bank accounts, to execute transactions such as trading stocks or moving money, governmental authorities and insurance companies allow for returns and claims to be filed, while financial institutions, and medical service providers may allow access of certain confidential data by trusted third parties. Merchants may make goods available to consumers for electronic purchase, thereby eliminating a physical face-to-face transaction.

A consumer or account holder may use one or more identifiers (which could be electronic) to access their account or to perform a purchase transaction. An identifier may comprise a bank account number, a credit card number, a medical patient number, or information corresponding to a government ID (e.g., Social Security Number ("SSN") or a Real-ID driver's license) or the like, collectively known as Personally Identifiable Information (PII).

However, the use of PII for both identifiers as well as authenticators using current technology for eCommerce, electronic transactions or any relationship that merely relies on electronic interconnectivity is insufficient to ensure the validity of transactions in a way usually necessary for a notarial type transaction. Current systems lack the technological structure and configuration to implement security that authenticates and authorizes the use of identifiers for transactions. While some service providers and financial institutions have implemented dual-factor authentication systems that use SMS (short message service) or emailed authorization codes to increase security, these systems require a central server to generate tokens and communicate those tokens to the user's computer system, which is subject to interception and/or redirection during transmission to the user. In addition, these dual-factor systems may include centralized stores of valid tokens, which are vulnerable to compromise through hacking or other means, allowing access to potentially usable tokens. Further, existing systems generate and push personal identification numbers (PINs) or tokens to the users that do not include any embedded information that is used to limit the use or validation of the tokens.

When transactions are performed locally and manually and the purchaser or user interacts directly with the merchant or service provider, the merchant or service provider has an opportunity to verify the identity of the consumer, but often is not sufficiently skilled to detect fraudulent identification. These problems are further compounded when the parties are remote from one another and their communication is reduced to an on-line connection.

Although remote notarizations are likely to begin to be more commonplace in the very near future, caution towards progress remains an issue. State, federal and bankruptcy courts have invalidated mortgages and other documents due to defective notarizations. When such an issue occurs in a real estate transaction, proper ownership rights and the lender's lien position are not only jeopardized but the enforceability of the mortgage itself is put at risk.

A report by the district attorney of New York County indicates that the victims of real estate fraud, such as deed fraud, are largely from the most vulnerable segments of our society including the elderly, the financially disadvantaged, the medically infirm, the uneducated, and the unsophisticated, as well as those who are deceased. The elderly, who might not use their credit often, and the homeless are also at an additional risk according to the Government Accountability Office. For example, deed fraud may begin with the fraud instigators, or scammers, forging the real estate owner's signature on a deed, transferring ownership to a straw buyer, bogus company or fictitious person. The scammer then gets an improper notarization of the fraudulent deed executed. Improper notarizations fall into several categories, including the situations where the signature on the deed was notarized without the signer being present, the notary affixed their seal and signature to unsigned documents, the notary failed to spot a fake identification document, and the scammers stole or forged a notarization seal. The scammers then record the fraudulent deed. Although many notaries are unsuspecting participants of this covert scheme, the ability to create a synthetic identity, such as by co-mingling fake identity attributes and real social security numbers, provides expanded opportunities for scammers to engage the notary community.

These and other issues still remain as a fundamental hindrance to reaching a goal of maintaining the fundamental principles of the traditional notarization transaction regardless of the technology used to create a signature along with maintaining technology neutrality. As a result, there is a need to have an alternate process for managing electronic notarization processes, or any similar signature validated transaction process, that leverages current technologies and distributed systems to allow for virtual or distributed on-line notary transactions. Such a process and system can further facilitate commercial transactions in a global world while being legally enforceable and compliant with jurisdictional rules and regulations while being secure and providing privacy protection. The present disclosure attempts to address this need.

SUMMARY

According to one implementation, a method is described. The method includes establishing a secure communication connection with a user device and with a signature authorizing agent device based on a request from a user for signature validation as part of a signature validated transaction and receiving a plurality of user identification elements from the user device over the secure communication connection, the plurality of user identification elements including an identification image and at least one additional identification attribute, the identification image including at least one jurisdiction attribute. The method further includes applying at least one machine learning technique to generate an identity verification score, the at least one machine learning technique including generating an identification credential metric as part of the identity verification score using the subset of the plurality of user identification elements and a credentials database. The method also includes determining a jurisdiction validity score based on identification of a location associated with the signature validated transaction and a jurisdiction attribute from the identification image. The method additionally includes providing the identity verification score and the jurisdiction validity score to the signature authorizing agent device and generating an electronic signature validation associated with the signature authorizing agent for the signature validated transaction if the identity verification score is above a first predetermined threshold and the jurisdiction validity score is above a second predetermined threshold.

According to another implementation an apparatus is described. The apparatus includes a network interface that is configured to establish a secure communication connection with a user device and with a signature authorizing agent device based on a request from a user for validation of a signature as part of a signature validated transaction. The apparatus further includes a processor coupled to the network interface, the processor receiving a plurality of user identification elements from the user device over the secure communication connection, the plurality of user identification elements including an identification image and at least one additional identification attribute, the identification image including at least one jurisdiction attribute. The apparatus additionally includes an artificial intelligence engine that applies at least one machine learning technique to generate an identity verification score, the at least one machine learning technique including generating an identity verification score as part of the identity verification score using the subset of the plurality of user identification elements and a credentials database. The artificial intelligence engine further determines a jurisdiction validity score based on identification of a location associated with the signature validated transaction and a jurisdiction attribute from the identification image. The processor further provides the jurisdiction validity score and the identity verification score to the network interface for communication to the signature authorizing agent device and generates an electronic signature validation associated with the signature authorizing agent for the signature validated transaction if the identity verification score is above a first predetermined threshold and the jurisdiction validity score is above a second predetermined threshold.

According to another implementation, a system is described. The system includes an end user device that includes a network interface and a processor for facilitating a signature authorization request for a signature validated transaction and a signature authorization agent device that include a network interface and a processor for facilitating a signature authorization activity for the signature validated transaction. The system also includes a clearinghouse device that includes a network interface, a processor, and an artificial intelligence engine. The clearinghouse device is configured to establish a secure communication connection with a user device and with a signature authorizing agent device based on a request from a user for signature validation as part of a signature validated transaction and receive a plurality of user identification elements from the user device over the secure communication connection, the plurality of user identification elements including an identification image and at least one additional identification attribute, the identification image including at least one jurisdiction attribute. The clearinghouse device is further configured to apply at least one machine learning technique to generate an identity verification score, the at least one machine learning technique including generating an identification credential metric as part of the identity verification score using the subset of the plurality of user identification elements and a credentials database as well as determine a jurisdiction validity score based on identification of a location associated with the signature validated transaction and a jurisdiction attribute from the identification image of the user. The clearinghouse device is further configured to provide the identity verification score and the jurisdiction validity score to the signature authorizing agent device and generate an electronic signature validation associated with the signature authorizing agent for the signature validated transaction if the identity verification score is above a first predetermined threshold and the jurisdiction validity score is above a second predetermined threshold.

According to another implementation, a method is described. The method includes establishing a secure communication connection with a clearinghouse device based on a request from a user for validation of a signature as part of a signature validated transaction. The method further includes receiving an identity verification score from a clearinghouse device, the identity verification score generated by applying at least one machine learning technique to a subset of a plurality of user identification elements, the at least one machine learning technique including generating an identification credential metric as part of the identity verification score using the subset of the plurality of user identification elements and a credentials database. The method additionally includes receiving a jurisdiction validity score from the clearinghouse device, the jurisdiction validity score based on identification of a location associated with the signature validated transaction and a jurisdiction attribute from the identification image of the user. The method also includes authorizing the generation of an electronic signature authorization at the clearinghouse device for the signature validated transaction if the identity verification score is above a first predetermined threshold and the jurisdiction validity score is above a second predetermined threshold.

According to another implementation, a computer readable medium is described. The computer readable medium carries instructions in the form of program code that, when executed on one or more processors establishes secure communication connection with a user device and with a signature authorizing agent device based on a request from a user for signature validation as part of a signature validated transaction, receives a plurality of user identification elements from the user device over the secure communication connection, the plurality of user identification elements including an identification image and at least one additional identification attribute, the identification image including at least one jurisdiction attribute. The program code applies at least one machine learning technique to generate an identity verification score, the at least one machine learning technique including generating an identification credential metric as part of the identity verification score using the subset of the plurality of user identification elements and a credentials database. The program code further determines a jurisdiction validity score based on identification of a location associated with the signature validated transaction and a jurisdiction attribute from the identification image of the user. The program code also provides the identity verification score and the jurisdiction validity score to the signature authorizing agent device and generates an electronic signature validation associated with the signature authorizing agent for the signature validated transaction if the identity verification score is above a first predetermined threshold and the jurisdiction validity score is above a second predetermined threshold.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable.

DETAILED DESCRIPTION

Figure 1:
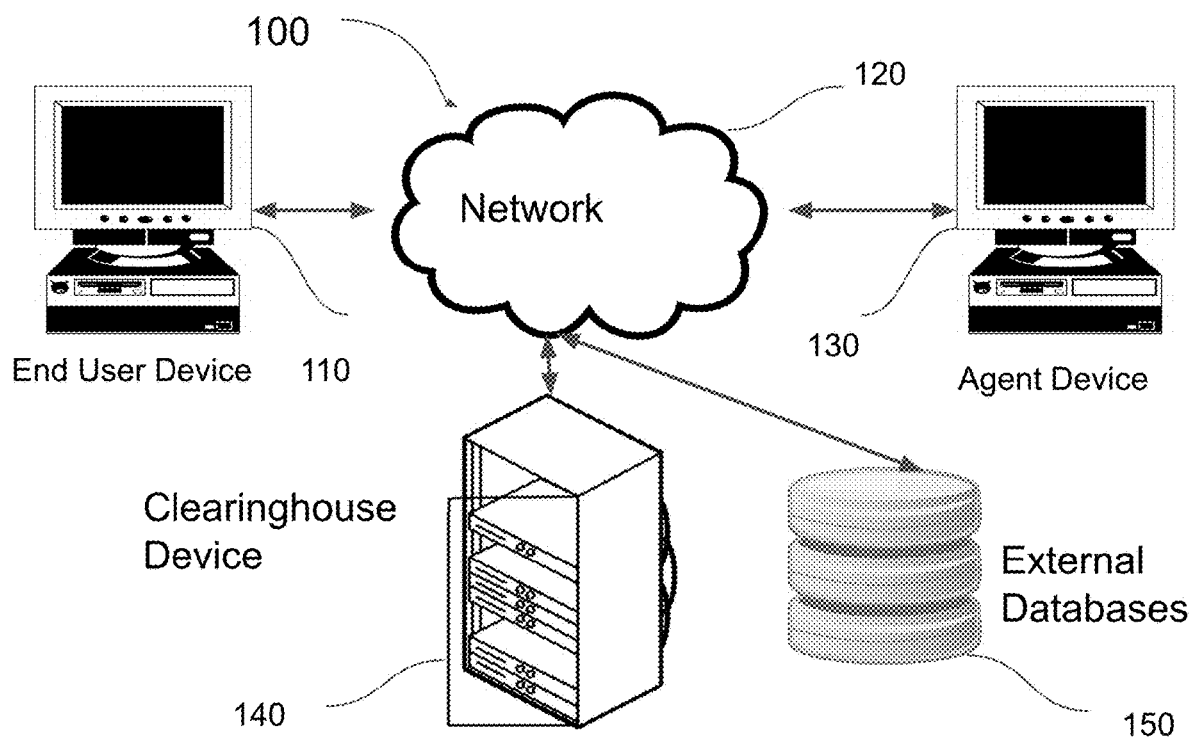
FIG. 1 is a block diagram illustrating an exemplary system for performing online transactions according to principles of the present disclosure.

It should be understood that the elements shown in the figures may be implemented in various forms of hardware, software or combinations on one or more appropriately programmed general-purpose devices, which may include a processor, memory and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

As used herein, the term "processor" broadly refers to and is not limited to a single- or multi-core general purpose processor, a special purpose processor, a processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. As used herein, the terms "transaction" and "electronic transaction" broadly refer to any transaction which may be electronically validated by the recited system, method, and apparatus.

Embodiments of the present disclosure relate to apparatuses, systems and methods for securing identification of the parties and their signatures in connection with the execution of a legal or business document using remote on-line notarial or similar signature validation transactions. This present disclosure facilitates the execution using a virtual notary or similar signature validation as part of the transaction, which may include the provision of a live electronic personal signatory verification. Specifically, the virtual signature validation is a process that is compliant with various standards, including the Uniform Electronic Transaction Act, and Electronic Signatures in Global and National Commerce Act. The virtual signature validation may utilize electronic components, (digital web cam, electronic signature and thumbprint pad, electronic notary seal, electronic notary journal, video/audio transmission software for cellular/PDA or portable pc device, P.O.S. {point of sale}device, and electronic transaction manager {computer}, electronic scanner/printer, electronic remote notary/client software). The virtual signature validation allows for both a user requesting the validation, known as a signatory, and a signature authorizing agent, such as a notary, to execute electronic signature validation transactions on-line from remote locations.

The systems and methods discussed and defined herein set forth the necessary steps to operate a clearinghouse device, as a trusted intermediary, for a variety of on-line transactions that require notarization or similar signature authorization. These systems and methods include the functions necessary to fulfill all the requirements to serve as an intermediary between remote parties and devices to settle or complete all such transactions.

Some of the clearinghouse device functions may be fully or partly implemented using artificial intelligence (AI) functional elements, and in particular machine learning techniques, that may be included in hardware and/or encoded in software. Currently, seven patterns of AI functionality have been identified, including hyper-personalization, autonomous systems, predictive analytics and decision support, conversational/human interactions, patterns and anomalies, recognition systems, and goal-driven systems. The system and methods defined in this application leverage these AI patterns to facilitate and improve the compliance to a notarial act or transaction that is performed in a virtual or remote manner. These AI patterns may produce scoring matrices and other analyses that are used within the clearinghouse device. There are certain components for a legal remote online notarial or similar type transaction that machine learning can perform to ensure the integrity and legal compliance. These components include, but are not limited to, signer and notary public Identity verification, signer identity credential verification, validation of venue and jurisdiction, verification associated with the licensure of the notary, legal compliance, verification of proper notarization and validation, and remote online notarial transaction service request routing.

FIG. 1 is a block diagram illustrating an example of a system 100 for performing online transactions according to principles of the present disclosure. System 100 includes an end user device 110, agent device 130, clearinghouse device 140, and external databases 150 are coupled to each other through a network 120. Network 120 may be a public or semi-public wide area network, such as the internet, that is configured to facilitate electronic communication between the end user device 110, agent device 130, clearinghouse device 140, and external databases 150, which may each be at different locations. The end user device 110 and agent device 130 each may include a processor along with various types of memory elements as well a network interface that may be used in conjunction with other devices in system 100 to facilitate a request for a witnessed signature of a document. Such a request, which may be referred to as a signature authorization request, may be made in conjunction with any legal or business activity or transaction requiring proof of identity for the person making the request and may be referred to as a signature validated transaction. Examples of signature validated transactions include but are not limited to, executing a will, completing a sales transaction such as the sale of real property, or authorizing a power of attorney and the like. The end user device is used by a user or requester of the signature validation, sometimes referred to as a signatory. The agent device 130 is used by a signature authorizing agent (e.g., a notary or other official that may verify identification of a signatory) to perform the signature validation. Examples of signature authorizing agents include, but are not limited to a notary public, a required witness of a document, and a government official having responsibility for certification of a document. It is worth noting that in some embodiments, the external databases 150 may be physically integrated within clearinghouse device 140. It is also worth noting that end user device 110 and/or agent device 130 may also include other elements necessary for operation and function as required by the end user and the agent including, but not limited to audio and display elements, user interfaces, and video capture elements, and the like. These elements are not described in detail here as they are well known to those skilled in the art. Exemplary embodiments of either end user device 110 or agent device 130 may include a desktop computer, a laptop computer, a tablet, a mobile phone, and similar devices.

The clearinghouse device 140 may include one or more processors and memory elements for managing activities associated with completion of a signature validated transaction. The one or more processors may include general processing elements for managing data as well as specific purpose processors configured for dedicated information processing and calculations. Such specific purpose processors may include one or more processors configured to perform machine learning algorithms as part of an application of artificial intelligence applied to various aspects of completing the signature validated transaction. The various processing elements in clearinghouse 140 are configured to perform a series of functions associated with a signature validated transaction, such as a remote online notary transaction. These functions may be implemented using a combination of hardware and various software applications or modules. These functions include, but are not limited to, notary registration, identify proofing of the participants for a transaction requiring notarization or signature validation, jurisdiction rule analysis, venue analysis, notarial act or other procedural analysis, and standards analysis.

Clearinghouse 140 also includes a network interface for connecting to network 120 in a manner similar to that described above. Clearinghouse 140 may also include a separate network interface for connecting to network 120 or to a different network (not shown) and configured to specifically communicate with external databases 150 separate from other communication. Exemplary embodiments of clearinghouse 140 include, but are not limited to, a server, a mainframe, a central network device, and the like. Additional details related to the configuration and operation of a clearinghouse device, such as clearinghouse device 140, will be described below.

External databases 150 include a plurality of storage elements along with a network interface similar to that described above and contain a repository of data that may be used as part of the verification of any documents provided by, and validation of the identity of, the user requesting signature validation for a signature validated transaction. Examples of such databases include motor vehicle registration information by jurisdiction (e.g., city, county, province, state, country, region), voter registration information by jurisdiction, legal document information by jurisdiction, statutes and laws information by jurisdiction, and the like. The external databases 150 may include government approved databases (GADs), such that the information contained in the database is registered, managed, and/or approved for use by one or more jurisdictions. Clearinghouse 140 may also be configured with storage elements that contain additional data similar to the data found in external databases 150 that may also be used and part of the validation and verification process.

In operation a secure communication connection is established between the agent device 130 and clearinghouse device 140 as well as between the end user device 110 and clearinghouse device 140. Examples of a secure communication connection include, but are not limited to, secure hypertext transport protocol (https) utilizing transport layer security layer security (TLS) or a secure sockets layer (SSL), SSL authentication, internet relay chat (IRC), and the like. The secure communication connections may be established at the same time or at different times. For example, the end user device 140 may establish a secure connection as part of an initial request made by a user through the end user device 140 for validation of a signature on an electronic document associated with a signature validated transaction. Clearinghouse device 140 may further process the user request to select a signature authorizing agent that is able to provide the signature validation. The ability of a signature authorizing agent may, for example, be determined by the location of the user and the focus of the document to be notarized. The selected signature authorizing agent confirms acceptance to clearinghouse device 140 through agent device 130, after which the establishment of the secure communication connection with the end user device 140 can occur. It is worth noting that in other embodiments, the signature authorizing agent may have already established contact with the end user without the need for selection by clearinghouse device 140.

Once the secure communication connection is established with end user device 110, the end user device 110 transmits a plurality of user identification elements from the end user device over the secure communication connection. The plurality of user identification elements includes an identification image and at least one additional identification attribute. Clearinghouse device 140 processes the one or more of the user identification elements to generate an identity verification score. The identity verification scores are based on an artificial intelligence driven comparison of attributes of the user identification elements to available data or similar identification images contained in databases. Clearinghouse device 140 may use data stored in an internal database or may establish a communication connection to external databases 150. It is worth noting that in some embodiments, the user identification elements are requested by clearinghouse 140 and transmitted by the end user device 110 prior to the secure communication connection being established with the agent device 130.

Clearinghouse 140 further determines a jurisdiction validity score that is related to the electronic document associated with the signature validated transaction. The electronic document may have been provided by the user through end user device 110 either as part of the initial request or at any time prior to determining the jurisdiction validity score. Clearinghouse 140 further provides the identity verification score and the jurisdiction validity score to agent device 130 for review by the signature authorizing agent. Clearinghouse 140 also generates an electronic signature authorization for the electronic document based on the identity verification score and the jurisdiction validity score and any further review or evaluation by the signature authorizing agent. Based on the information provided to the signature authorizing agent, the agent may authorize clearinghouse device 140 to generate a signature validation in order to complete the execution of the transaction. Further aspects associated with distributed on-line transactions involving signature validation using a clearinghouse device will be described in further detail below.

Figure 2:
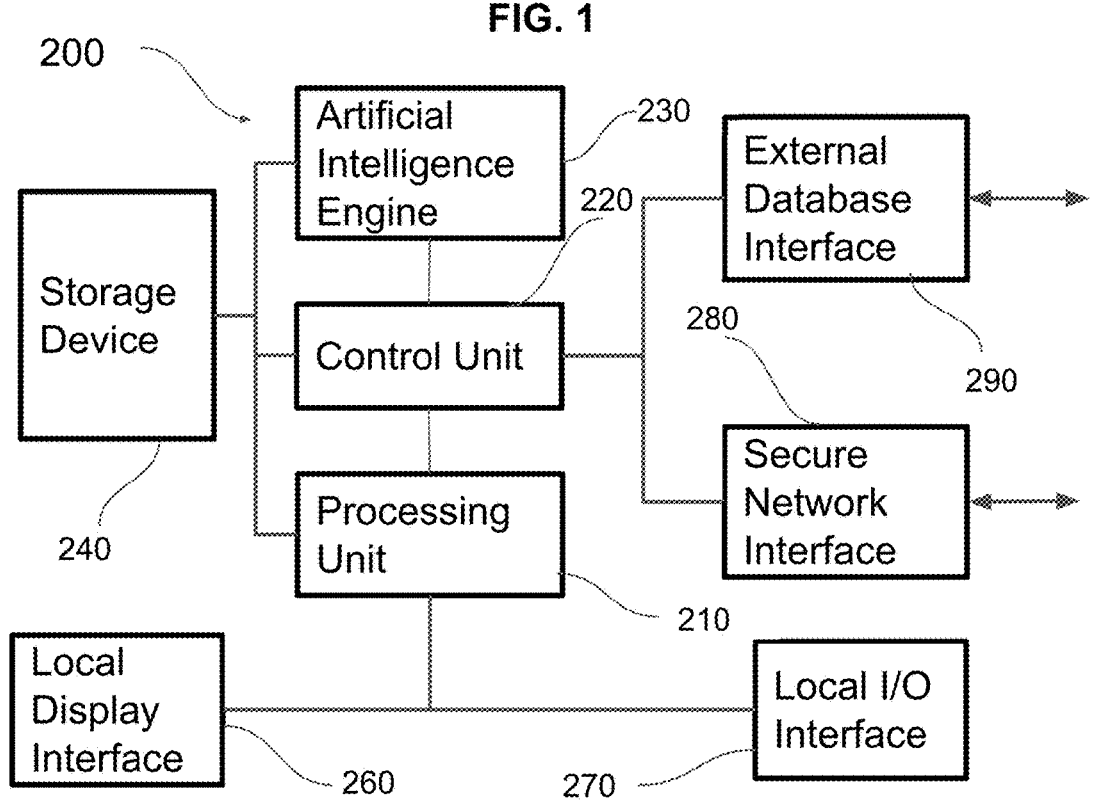
FIG. 2 is a block diagram illustrating an example of a clearinghouse device used for managing a distributed online transaction according to principles of the present disclosure.

FIG. 2 is a block diagram illustrating an example of a clearinghouse device 200 used for managing a distributed online transaction according to aspects of the present disclosure. Clearinghouse 200 may be similar to and operating in a manner as, clearinghouse 140 described above. Clearinghouse device 200 includes a processing unit 210. Processing unit 210 is coupled to control unit 220. Control unit 220 is coupled to artificial intelligence (AI) engine 230 as well as secure network interface 280 and external database interface 290. Processing unit 210, control unit 220 and AI engine 230, are each coupled to storage device 240. Processing unit 230 is further coupled to local display interface 270 and local I/O interface 270.

The control unit 220 provides information and data routing management functions in clearinghouse device 200. In addition, control unit 220 manages operations of the various elements contained in clearinghouse device 200. Control unit 220 may also manage the data transfer and storage functions associated with storage device 240. The processor 210 executes instructions to perform some of the functions necessary for operation of the clearinghouse device 200. These functions include, but are not limited to, data conversion, user input processing, user output and content display processing, and the like. The processor 210 receives instruction code to perform the functions from programming code stored in storage unit 240. The AI engine 230 may include specific programming code to execute complex mathematical operations that are associated with machine learning algorithms and processes as part of an on-line signature validated transaction. The AI engine 230 performs these processes based on instructions that are stored in storage unit 240.

The processor 210, controller 220, and AI engine 230 may be formed by any known and suitable hardware, or software, or a combination of hardware and software. For example, the processor 210 may be formed by dedicated hardware such as a processing circuit, or by a programmable processing unit such as a Central Processing Unit (CPU). Control unit 220 may include dedicated hardware, such as switches, couplers, and the like, or may be formed by a programmable logic unit (PLU) or programmable logic controller (PLC). may be formed by one or more processors specifically configured for arithmetic operations, such as an arithmetic logic unit (ALU), or floating-point unit (FPU). It is worth noting that in some embodiments, one or more of processor 210, controller 220, and AI engine 230 may be combined and included in a single structure, such as an integrated circuit, multi-chip module. The combination of these elements may collectively be referred to as a processor.

The storage unit 240 stores program instructions to be executed by the processor 210, controller 220 and AI engine 230 along with various data, including for example images and files along with data associated with those images and files and intermediate data used as part of computations and functions performed by the processor 210, controller 220 and AI engine 230. The storage device 240 may include any suitable storage components or elements capable of storing the programming code, data, or the like in a computer-readable manner. Examples of elements storage unit 240 include non-transitory computer-readable storage media such as semiconductor memory devices, and magnetic, optical, or magneto-optical recording media loaded into a read and write unit. The semiconductor memory devices may include but are not limited to, RAM, ROM, Electrically-Erasable Programmable ROM (EEPROM), and flash memory.

The local I/O interface 270 may include one or more input elements that may be used by a user for entering data and/or control operation of clearinghouse device 200. The one or more input elements include, but are not limited to a keyboard, a mouse, a trackball, microphone, a touch panel, and the like. The local I/O device 270 may include one or more output elements that may be used by a user to retrieve and consume information received and/or processed by clearinghouse device 200. The one or more output elements include, but are not limited to, a set of panel lights, a speaker, a vibratory unit, and the like.

The local display interface 260 may include one or more driver circuits and interfaces needed for electrically connecting a display device (e.g., display monitor, television, tablet) to clearinghouse device 200. Some examples of driver circuits and interfaces include, but are not limited to, HDMI, DVI, and VGA.

The secure network interface 280 provides an interface between the clearinghouse device 200 and any external devices (e.g., end user device 110, agent device 130). The secure network interface unit 280 may be communicable over a network (e.g., network 120) with the external device via wired or wireless communication medium using one or more communication protocols. The communication protocols include, but are not limited to, data over cable system interface specification (DOCSIS 3.0), IEEE 802.3 (Ethernet), IEEE 802.11, cellular 3G, cellular 5G, and the like.

The external database interface 290 provides an interface between the computing device 100 and any external apparatus. The interface unit 150 may be communicable with the external apparatus via cable or wireless communication medium using one or more communication protocols. The communication protocols include, but are not limited to, IEEE 802.3 (Ethernet), IEEE 802.11, cellular 3G, cellular 5G, and the like.

In operation, a secure communication connection is established through secure network interface 270 with a user device (e.g., user device 110 in FIG. 1) and with a signature authorizing agent device (e.g., agent device 130 in FIG. 1). The connection may be established based on a request that has been made by a user for validation of a signature as part of a signature validated transaction in a manner as described above. The user loads a plurality of identification elements onto the user device and provides the identification image over the secure communication connection. The identification elements include an identification image as well as one or more identification attributes. The identification image may be a driver's license, a government issued identification card, a passport or other government approved identification document. The identification attributes may include, but are not limited to, a social security card or number, a recognized association membership card or number, a fingerprint scan, a biometric scan, as well as any other personal identification information. Processor 210 receives the identification elements through secure network interface 270 and identifies or determines a subset of the identification elements for further processing. In some embodiments, the process 210 determines the subset of the plurality of identification elements using a pseudo-random computer selection process. The use of an essentially random selection process helps to ensure that a user cannot be sure which identification elements will be used for further processing.

The identification elements, including the identified or selected subset, are provided to AI engine 230 to initiate one or more machine learning techniques to generate one or more scores for various signature authorization parameters that are reviewed as part of a signature validated transaction. For example, the machine learning techniques generate an identity verification score. The machine learning techniques generate an identification credential metric using the selected subset of the identification elements. The identification credential metric makes up all or a portion of the identity verification score. In one embodiment, the identification credential metric may be generated by using machine learning techniques to process one or more credential attributes from the identification image included in the selected subset with training information that is created from similar credential attributes for similar types of identification images. These images may be available from a database that is stored in storage device 240 or may be accessed from the one or more external databases that can be accessed through external database interface 290. Several credential attributes from the identification image may be used including, but not limited to, a jurisdiction of issue, an address for the cardholder, a birthdate for the cardholder, an identification number, an expiration date, a hologram, and a cardholder photo. Further in some embodiments, machine learning techniques may be used to generate an identification metric associated with the identification image along with a series of answers provided by the user to questions generated as part of the machine learning technique or as part of a biometric or image scan of the user during the before or during the secure communication connection between the user or signatory (e.g., through end user device 110 in FIG. 1) and the signature authorizing agent (e.g., through agent device 130 in FIG. 1). The identification metric may be included as part of the identity verification score.

The AI engine 230 also determines a jurisdiction validity score. The jurisdiction validity score may be determined based on several characteristics or attributes associated with the user, the signature authorizing agent, and the electronic document which is the subject of the validated signature transaction. In one embodiment, the jurisdiction validity score may be determined based on a geographic location associated with the signature validated transaction and a jurisdiction attribute associated with the identification image of the user. In some embodiments, the jurisdiction validity score may be determined at least in part by applying at least one machine learning technique in a manner similar to the signature validity score. For instance, the jurisdiction validity score may be generated by applying at least one machine learning technique to generate a jurisdiction verification metric using a training mode associated with a jurisdiction attribute identified from the identification image. Additionally, AI engine 230 may, for example, apply at least one machine learning technique to generate a venue verification metric using a training model associated with the location of the signature authorized transaction and information from a database of venues. AI engine 230 may additionally apply at least one machine learning technique to generate a legal compliance score for the signature validated transaction using some form of a signature authorization certificate, such as notarial certificate, which is associated with a jurisdiction of the signature authorizing agent. In some embodiments, certain aspects of the machine learning techniques, such as the training information or training model, may be updated based on the evaluation of any of the identified credential attributes from the identification image.

The scores (e.g., signature validity score, jurisdiction validity score, venue validity score, legal compliance score, or any other relevant metric score) generated or determined by AI engine 230 are provided to processor 210 for formatting and packaging in an analysis package. Other data may also be included in the analysis package. The analysis package is delivered through secure network interface 280 to the signature authorized agent device (e.g., agent device 130) for review by the agent. Processor 210 generates an electronic signature authorization associated with the signature validation agent for the signature validated transaction based on the scores for the various signature authorization parameters. For instance, the electronic signature authorization may be generated if the identity verification score is above a predetermined identity verification score threshold and the jurisdiction validity score is above a predetermined jurisdiction validity score threshold. These thresholds may be established based on a set value or a percentage value that is determined based on the values generated as part of the metrics in the machine learning techniques used to generate the scores. For example, the thresholds may be identified as at least 80 percent of all of the credential metrics or elements that make up the scores indicate a positive result value or indicate confirmation of acceptance or validation.

In some cases, if the identity verification score is not greater than (e.g., less than or equal to) the identity verification score threshold, the transaction may be terminated prior to establishing the secure connection with a signature authorization agent (e.g., through agent device 130). In other cases, the user may be given an opportunity to provide additional information (e.g., additional identification elements or answers to questions generated as part of the machine learning techniques) in order to correct the deficiency in the identity verification score prior to involving the signature authorization agent. Further, even after involving a signature authorization agent and establishing the secure communication connection with the agent device, one or more of the scores for the various signature authorization parameters generated by AI engine 230 may be determined to be unacceptable or may be considered a risk for validation. The signature authorization agent is provided with this information and may choose to not authorize the generation of the signature validation based on the information provided by clearinghouse device 200. Alternatively, the signature authorizing agent may request more information or review other gathered data from the user as part of the transaction through clearinghouse device 200, such as a different identification image, other identification elements, answers to additional questions related to their identification, or even biometric voice or facial analysis for the user acquired during a video conference as part of the secure communication connection and provided by the clearinghouse device 200. The signature authorizing agent may make a final determination as to whether to allow or prohibit the generation of the signature authorization following evaluation of the additional information.

The AI engine 230 may implement several machine learning techniques and apply them to, for instance, the generation of the identity verification score described herein. One such technique is the model-parameters-learner (MPL) technique. In this technique, the model is the systematic function that generates predictions or identifications, such as the identification and analysis of credential attributes from an image. The parameters are the signals or factors used by the model to form decisions, such as the template or reference information (e.g., from a database) used in conjunction with capturing credential attributes along with correlation information from the user. The learner portion includes an algorithm, referred to as a training model, for adjusting the parameters, and if necessary, adjusting the model, by looking at differences in predictions versus actual outcomes, such as generating decisions or scores for credential attributes. An exemplary machine learning technique using MPL, along with a set of training models, as applied to one of more of the present embodiments, will be described in further detail below. It is also worth noting that other machine learning techniques may be used in place of the MPL technique and applied to the generation of one or more of the scores described above. These other techniques include, but are not limited to, natural language processing, feed forward network processing, Kohonen neural network processing, recurrent neural network processing, and convolutional neural network processing.

Figure 3:
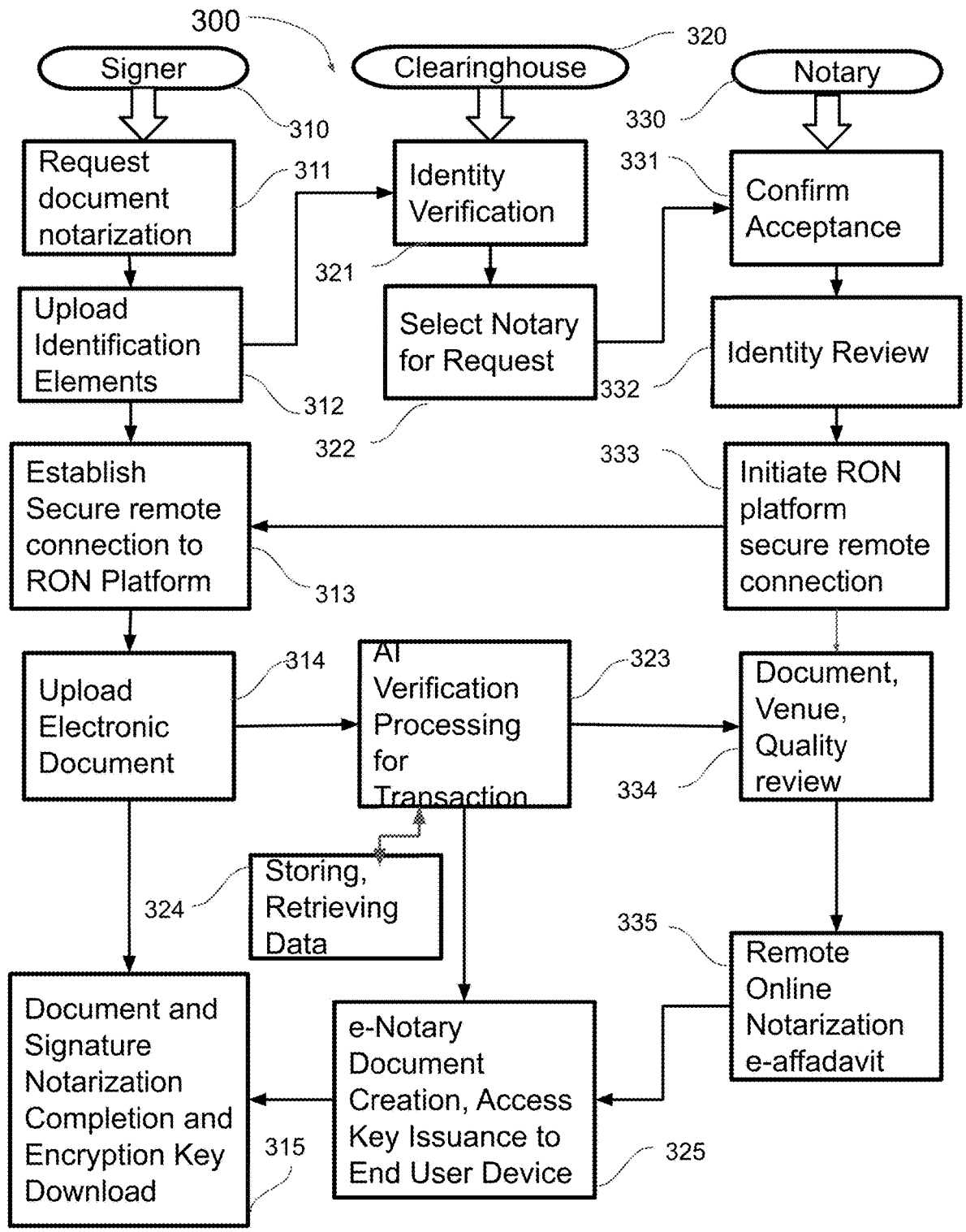
FIG. 3 is a flow chart of an exemplary process associated with a distributed online transaction according to principles of the present disclosure.

FIG. 3 is a diagram of an exemplary process 300 associated with a distributed online transaction according to principles of the present disclosure according to principles of the present disclosure. Process 300 is described with reference to system 100 in FIG. 1 as well as clearinghouse device 200 in FIG. 2. Process 300 will be specifically described with respect to an online notarial transaction using a notary public as the agent for e-notarization of an electronic document. An online notarial transaction is a type of transaction that can benefit from additional review of the elements of the transaction using the machine learning techniques available in an artificial intelligence engine, such as AI engine 230. It is worth noting that some or all of the elements of process 300 may equally apply to other signature validated transactions involving other types of documents as well as to the involvement of other types of signature validation agents as are described elsewhere in the present disclosure.

Process 300 involves three entities that carry out the various steps involved, including signer 310 and agent 330, along with the on-line intermediary, clearinghouse 320. Actions or elements associated with each are arranged in columns with arrows generally indicating the flow of information horizontally and the advancement of process 300 vertically. Clearinghouse 320 provides the functionality similar to that described for clearinghouse 200 in FIG. 2. In addition, clearinghouse 320 provides software that is available as part of a remote online notary (RON) platform that is used by notary 330 to perform the acts required to perform an e-notarization of an electronic document. More specifically, the RON platform include specific features and functions for, secure audio/video conferencing, electronic document processing, identity verification, creation and affixing electronic signature, affixation of an e-Notary Seal, appended the notary e-journal, and collecting the required fees from the Signer and crediting the notary's account.

Notary 330 may download the software from RON platform at clearinghouse 320 to their device (e.g., agent device 130). The signer 310, as well as other interested parties, may be given access to the RON platform by creating a secure web session using a supplied uniform resource locator (URL) address to access or by downloading a specific transaction support software application from the RON platform to their device (e.g., end user device 110). The RON platform is configured to establish and maintain secure connectivity between the devices of the notary 330 and the signer 310 as well as the other parties during the e-notarial transaction.

The signer 310 initiates process 300 by requesting notarization for an electronic document at element 311. The request may be made by accessing a website or by requesting access to the RON software application from clearinghouse 320. The signer 310 uploads an electronic version of a plurality of identification elements through his device through the website or the RON, at element 312. The request from the signer along with the identification elements are provided to clearinghouse 320 for identity verification, at element 321. The unique IP address for the device used by the signer (e.g., end user device 110) may be captured by clearinghouse 320 for later identity verification. The identification elements are processed by clearinghouse 320 using machine learning techniques to generate and evaluate an identity verification score in a manner similar to that described above.

The request received by the clearinghouse 320 is processed to select a notary public at element 322. The selection of a notary public may be determined based on information provided by individual notaries who have registered with clearinghouse 320 for use in e-notary transactions. The clearinghouse 320 provides an indication of the request for notarization to the device (e.g., agent device 130) of notary 330 after determining that notary 330 is available and willing to notarize documents, at element 331. This indication of the request may include sufficient information to allow notary 330 to determine that they are able to complete the transaction. The notary 330 may confirm their willingness to process the transaction back to clearinghouse 320.

It is worth noting that, in some cases, a specific notary may be selected to handle the signature authorized transaction request by the signer 310. The selection may be performed as part of initially establishing the use of the identified notary (e.g., notary 330) as the notary most suited to execute the notarization of the document, such as part of element 333. The identified or selected notary may also be changed at a later point in process 300 based on additional information provided by the signer 310. In some instances, the determination or selection of the notary that is may be performed using the one more machine learning techniques as described herein.

At element 332, the notary 330 reviews information regarding the identity of the signer 310 provided by clearinghouse 320, such as whether or not the identity verification score is acceptable (e.g., greater than a threshold value). In some instances, the identity verification score may also be provided to notary 330 for review. If the identity verification score is not acceptable, or if the notary 330 considers the identity verification score not high enough, then a limited number of "redress" attempts (e.g., two) are permitted, by returning to elements 312 and 321 before the transaction may be terminated.

Following the identity review at element 332 and acceptance by notary 330, a secure remote connection is initiated, at step 333, using the software on the RON platform. The software notifies the signer 330 and provides the device used by the signer with any access information to also establish a secure remote connection to the RON platform, at element 313. State regulations often require a notary (e.g., notary 330) to perform screening of the signatory (e.g., signer 310) via a signatory assessment screening survey (SASS) to answer questions regarding their volition, level of duress, and awareness to execute the signing of a legal document. The remote connection may include a video conferencing component to allow remote face to face interaction to fulfill this requirement and for further biometric voice and facial imaging recognition as well as evaluation for cognitive presence and signs of duress.

It is worth noting that basic facial recognition technology may be easily spoofed by using paper-based images from the internet. These spoof attacks could lead to a leak of sensitive data. Improved data and user authentication during remote video conferencing requires real time processing to validate an individual's identity to prevent unauthorized access. A more effective facial recognition technique uses deep machine learning anti-spoofing techniques leveraging facial liveness detection. Deep machine learning helps ensure that an optimal three dimensional (3D) depth analysis is executed through adequate comparison information (e.g. photo identification) is used as a source when comparing facial liveness events. Further, deep machine learning deploys relative key markers for facial liveness detection. These relative key markers consist of checks for eyes, color texture, photoshop, age and hair color differences and performs careful scrutinization regarding depth perception. In addition, different points on the image displayed as part of a video conference are compared to that of a previously digitized template. Additional deep machine learning layers may also include image distortion analysis, 3D sensing techniques, and skin texture analysis based on a computational algorithm. Facial liveness detection using the deep machine learning anti-spoofing techniques can significantly improve the validation a person's legitimate presence and current level of volition, duress, and awareness as well as prevent from facial spoof attacks.

At element 314, the signer 310 uploads an electronic document requiring notarization through his device to the RON platform, which provides the electronic document to clearinghouse 320. At element 323, the electronic document is processed for verification using machine learning techniques associated with an artificial intelligence engine (e.g., AI engine 230) to evaluate the validity of the jurisdiction, the appropriateness of the venue, and any necessary attributes required for legal compliance as part of the completion of the transaction. Various aspects or attributes associated with signer 310, the electronic document, and the notary 330. Examples of aspects or attributes include jurisdiction attributes from the identity credential for the signer, the location of the physical property associated with the electronic document, and the authorized venues for the notary 330 may be referenced against information and data found in databases that can be stored and retrieved or accessed, at element 324, by clearinghouse 320 as part of the machine learning technique. For instance, the notary 330 may be assigned a unique notary identifier that is generated based on information provided by the notary 330 and used, for instance, to determine venue appropriateness. Results of the processing at element 323 are provided to the device used by notary 330. The results may be reviewed, at element 334, by notary 330, and corrective actions taken. In some cases, no correction may be possible, such as an improper venue issue, and the transaction may be terminated.

Following the review at element 334, the notary 330 provides an e-affidavit and any other necessary information for authorizing the electronic notarization for the electronic document to clearinghouse 320, at element 335. The clearinghouse 320 receives the e-affidavit, at element 325, and creates the e-notary document along with an access key that is provided to the device used by the signer 310. The clearinghouse 320 may also generate an electronic entry in a journal associated with the notary 330 and maintained as part of the database records in clearinghouse 320. At element 315, the completed signed and notarized electronic document is made available for download by the device used by the signer 310 by using the provided access key. The on-line notarial transaction is considered complete and the secure remote connections are terminated through the RON platform.

Figure 4:
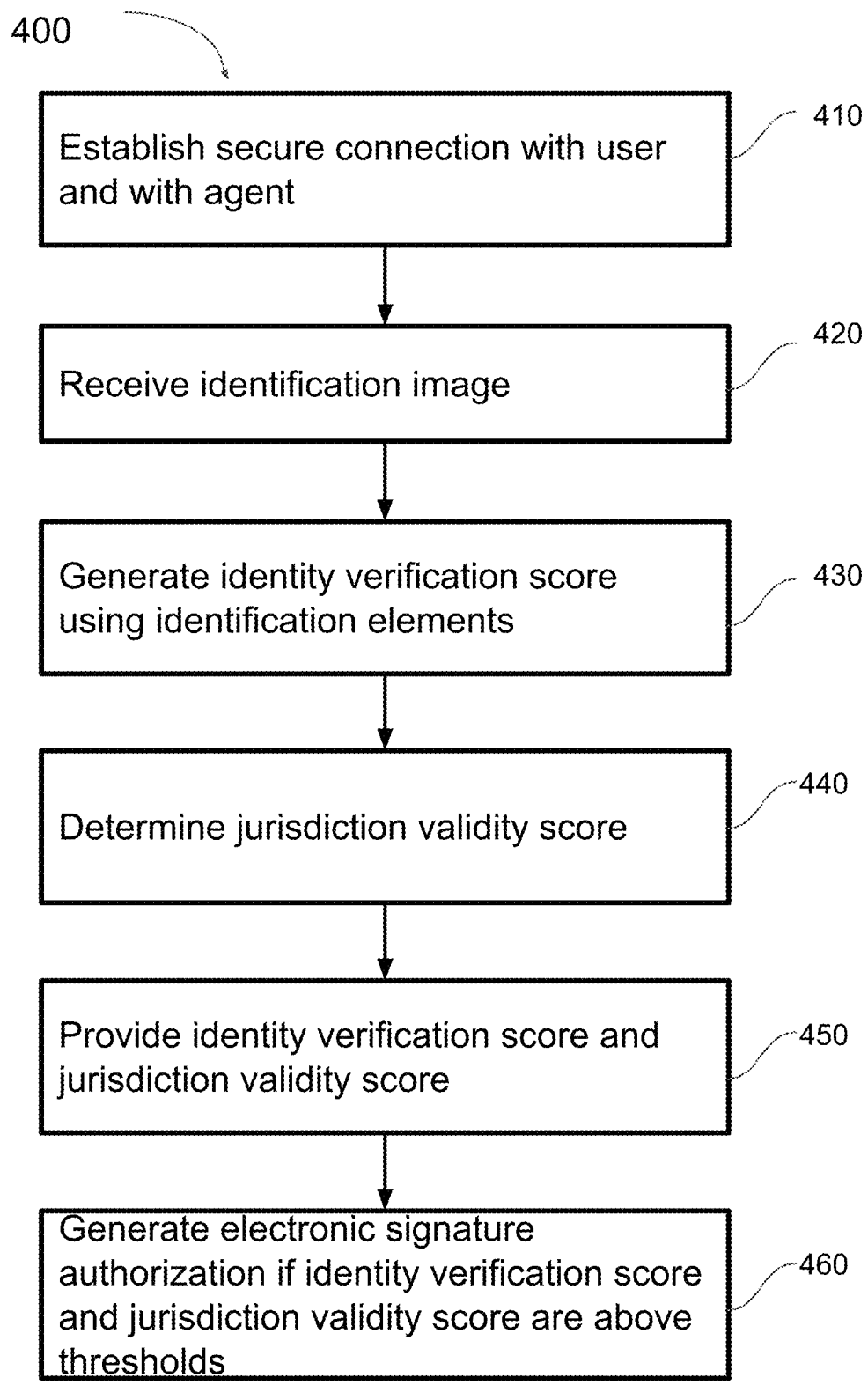
FIG. 4 is a flow chart of an exemplary process for managing a distributed online transaction according to principles of the present disclosure.

FIG. 4 is a flow chart of an exemplary process 400 for managing on-line transactions according to aspects of the present disclosure. Process 400 is primarily described with respect to a data processing device, such as clearinghouse device 200 described in FIG. 2. Process 400 may also be performed by one or more devices that operates within a system similar to system 100 described in FIG. 1. Although process 400 depicts steps performed in a particular order for purposes of illustration and discussion, the operations discussed herein are not limited to any particular order or arrangement. One skilled in the art, using the disclosure provided herein, will also appreciate that one or more of the steps of process 400 may be omitted, rearranged, combined, and/or adapted in various ways.

At step 410, a secure communication connection is established with a user device as well as with a signature authorizing agent device based on a request from a user for signature validation as part of a signature validated transaction. As described above, the secure communication connection may be established at the same time for both the user device and the signature authorizing device or at separate times. For instance, the secure communication connection may be established first with the user device. The signature authorizing agent using the signature authorizing agent device may be a notary public, a required witness of a document, a government official having responsibility for certification of a document. At step 420, a plurality of identification elements is received from the user device over the secure communication connection. The identification elements may include one or more identification images as well as one or more additional identification attributes. The identification images may be a driver's license, a government issued identification card, and a passport, or other similar valid and accepted identification. The identification attributes may be a social security card or number, a recognized association membership card or number, a fingerprint scan, a biometric scan, or any other suitable personal identification information At step 430, an identity verification score is generated. The identity verification score is generated by selecting or determining a subset of the received identification elements. The determination of the subset may be done using a pseudo-random process. The identity verification score is generated by applying one or more machine learning techniques to the subset of identification elements. The machine learning techniques include generating an identity credential metric that is included in the identity verification score using the subset of identification elements and a database of credentials. The credentials database may be retrieved from an internal memory, such as storage device 240 or may be retrieved from one or external credentials databases through a secure communication connection from the clearinghouse device, such as clearinghouse 200. In some embodiments, the identity credential metric is generated using a training model associated with one or more credential attributes from the identification image received at step 420. The credential attributes may include a jurisdiction of issue, an address for the cardholder, a birthdate for the cardholder, an identification number, an expiration date, a hologram, a cardholder photo, on any other attribute that can be processed in comparison to other similar known identification images.

In some embodiments, one or more machine learning techniques are applied to generate an identification metric using a training model associated with information contained on the identification image and additional information gathered for the user before or during the on-line transaction. The additional information may include video and biometric analysis of the user and/or a set of answers given by the user to questions as part of a screening survey analysis. The identification metric may be included with the credential metric as part of the identity verification score.

At step 440, a jurisdiction validity score is determined based on identification of a location associated with the signature validated transaction and one or more jurisdiction attributes associated with the identification image of the user. In some cases, the determination is made using simple comparisons of information, such as city, county, province, state, country, and so on. However, in some embodiments, the jurisdiction validity score may be determined by applying one or more machine learning techniques, in a manner similar to step 430, to generate a jurisdiction verification metric using a training mode associated with a jurisdiction attribute identified from the identification image. Further, in some embodiments, machine learning techniques may be applied to generate a venue verification metric using a training model associated with the location of the signature authorized transaction and a database of venues. The venue verification metric may be used as part of a venue validity score or may be used as part of the jurisdiction validity score.

In some embodiments, the determination, at step 440, may include generating a legal compliance score for the signature validated transaction. The legal compliance score may be generated by applying one or more machine learning techniques to a signature authorization certificate or a notarial certificate which is associated with the jurisdiction of the signature authorizing agent.

At step 450, information and data, including the identity verification score and the jurisdiction validity score, along with any other information or scores, are provided to the device used by the signature authorization agent (e.g., agent device 130). The information, and in particular the identity verifications score and jurisdiction validity score, may be reviewed and/or confirmed by the signature authorization agent. At step 460, an electronic signature authorization for the signature validated transaction is generated based on the information, and in particular, the identity verification score and the jurisdiction validity score. For instance, the electronic signature authorization is generated if the identity verification score exceeds a particular or predefined threshold value and the jurisdiction validity score also exceed a particular or predefined threshold value. The electronic signature may be attached in some manner, electronically or otherwise, to an electronic document that is the subject of the signature authorized transaction and access to the final executed document of information regarding the signature authorized transaction is provided to the device used by the user (e.g., end user device 110 in FIG. 1). The secure communication connections may then be closed.

It is worth noting that, as described above, the identity verification score or the jurisdiction validity score may not be acceptable for proceeding with generating an electronic signature authorization, at step 460. The signature authorization agent may choose to request more information from the user, such as a different identification image or answers to additional questions related to their identification or may decline to provide the electronic signature authorization.

It is also worth noting that in some embodiments the evaluation of the information from the identification image, such as the credential attributes, as well as any data gathered from the user during the on-line transaction may be added to the existing credentials database. The training models used in AI engine 230 for the machine learning techniques may be updated based on the new information and/or the evaluation of that information.

Figure 5:
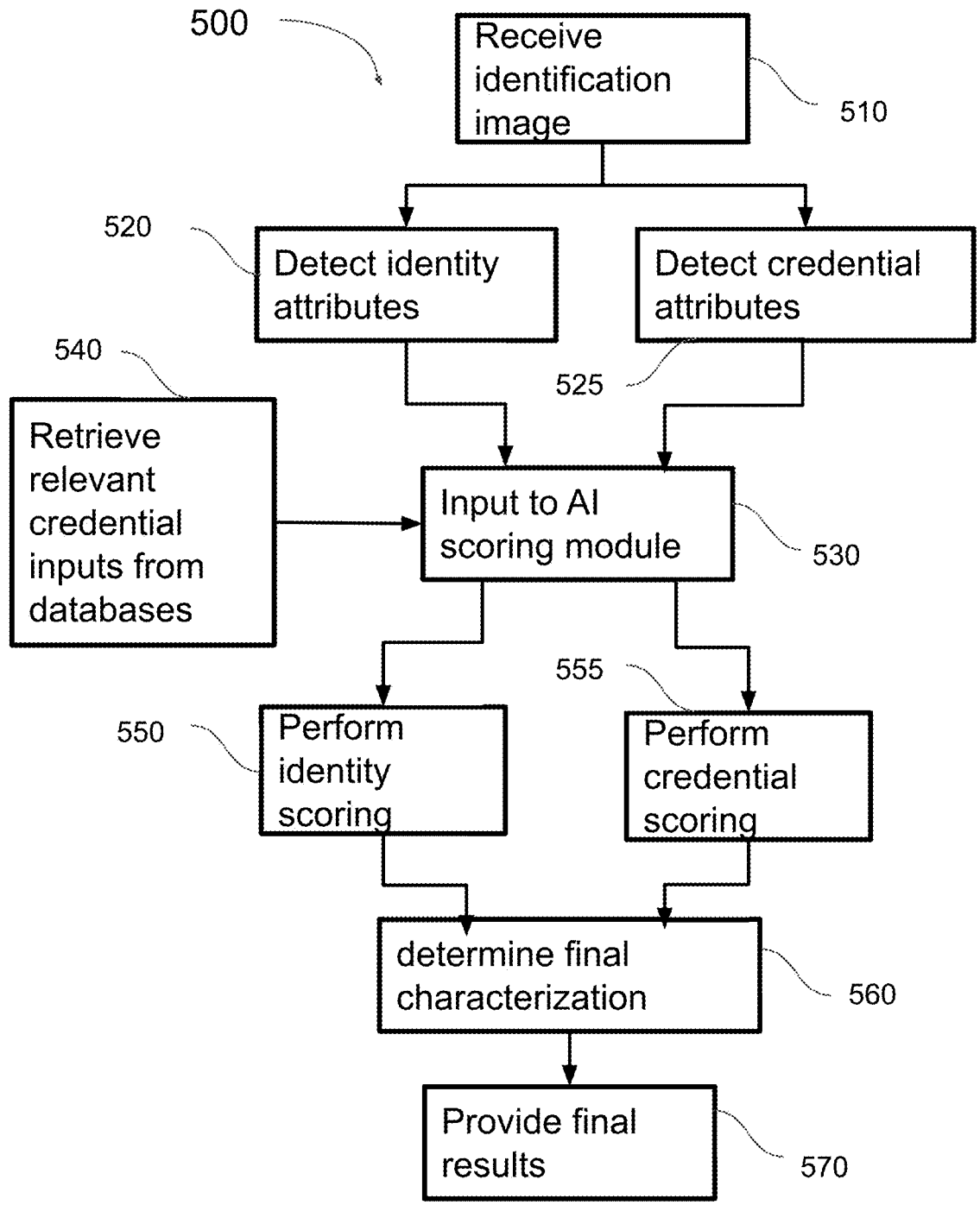
FIG. 5 is a flow chart of an exemplary training model associated with a machine learning technique used in managing a distributed online transaction according to principles of the present disclosure.

FIG. 5 is a flow chart of an exemplary training model 500 associated with a machine learning technique applied to managing a distributed online transaction according to aspects of the present disclosure. Model 500 may be incorporated into an AI processing circuit, such as AI engine 230 described in FIG. 2. Training model 500 may also be incorporated and used as part of a clearinghouse device, such as clearinghouse device 140 described in FIG. 1. Training model 500 will be described with respect to generating an identity verification score for an identification image that uses two parameter sets processed in conjunction to produce an identity verification metric and a credential validation metric that make up the identity verification score. One skilled in the art, using the disclosure provided herein, will also appreciate that one or more of the elements of training model 500 may be omitted, rearranged, combined, and/or adapted in various ways. For example, similar machine learning models may use only one parameter set or more than two parameter sets. Further, training model 500 may be applied to other parameter sets that are associated with one or more different types of machine learning techniques applied to a signature validated transaction.

At step 510, an identification image or credential, in electronic form, is received in the AI engine. The identification image or credential may be a driver's license, or any other type credential as described above. The identification image or credential may be in any known electronic format including, but not limited to, joint photographic experts group (JPEG), portable document format (PDF), portable network graphics (PNG) and the like. The AI engine electronically analyzes the image to detect characteristics or attributes in order to create the parameter set for executing the train model. As shown, at step 520, one or more identity attributes are identified and subsequently detected and captured. In one embodiment, the identification is assisted by using answers from the presenter of the identification image or credential to questions that may be generated by the AI processing circuit and provided to the presenter's device (e.g., end user device 110). The identity attributes may include, but are not limited to first name, last name, date of birth, place of birth, full name, partial government social security number and the like. Additionally, at step 525, one or more credential attributes are identified and subsequently input by the user or detected and captured. In one embodiment, the AI processing circuit creates and silos an issuing authority identity credential template and categories for credential attributes including, but not limited to, an identification credential hologram, a jurisdiction, a credential number, an expiration date, an issuance date, a cardholder photo, and other unique elements.

At step 530, the identity attributes from step 520 and credential attributes from step 525 are input to a scoring module in the AI processing circuit. In addition, at step 540, any relevant reference inputs from GADs or other relevant databases for the identification image or credential are also input to the scoring module and integrated with the attributes. In some embodiments, reference inputs may be input from databases (e.g., GADs) managed by e-Verify, Interpol, SSA's Electronic Consent Based Social Security Number Verification (eCBSV), National Association for Public Health Statistics and Information Systems (NAPHSIS) and American Association of Motor Vehicle Administrators (AAMVA) or other governmental or official database are input and integrated with the attributes.

The AI processing circuit initiates a separate scoring algorithm for each set of attributes. At step 550, the AI processing circuit initiates supervised classification algorithms to categorize results from identity attribute processing. Identity attributes inputs and answers are scored. The algorithms calculate identity attribute metric values for the set of attributes. A scoring matrix representing the possible output values for each identity attribute is shown below.

Machine Learning Identity Attribute Metric Matrix:
- First Name—Accurate spelling and connected to Last Name=+1 point
- First Name—Inaccurate spelling=−1 point
- First Name—Inaccurate spelling and last name disconnect=−1 point
- Last Name—Accurate spelling and First name connect=+1 point
- Last Name—Inaccurate spelling=−1 point
- Last Name—Inaccurate spelling and First name disconnect=−1 point
- GAD Date of Birth—GAD Matched month=+1 point
  - GAD Matched day=+1 point
    - GAD Matched year=+1 point
- Non-match of month/year=−1 point
- Non-match of day/month=−1 point
- Non-match of day/month/year=−1 point
- Full Name/Partial SSN match—Accurate spelling and GAD match=+1 point
- Full Name/Partial SSN match—Inaccurate spelling and GAD no match=−1 point
- Full Name and partial SSN GAD no match=−1 point Similarly, at step 555, the AI processing circuit initiates a supervised learning classification algorithm that matches a unique uploaded credential attribute with the issuing authority identification credential template. The algorithm calculates credential attribute metric values for the set of attributes A scoring matrix representing the possible output values for each credential attribute is shown below:

Machine Learning Credential Attribute Metric Matrix:
- Credential Holder Name—GAD match for Credential Holder Name and Credential=+1 point
- Credential Holder Name—GAD non-match Credential Holder Name and Credential=−1 point
- Credential Issuing Authority—GAD match to Credential=+1 point
- Credential Issuing Authority—GAD non-match to Credential=−1 point
- Type Identification Credential—GAD match to Credential=+1 point
- Type Identification Credential—GAD non-match to Credential=−1 point
- Credential I.D. Number—GAD match Credential I.D. number=+1 point
- Credential I.D. Number—GAD non-match to Credential I.D. number=−1 point
- Credential I.D. Number—Machine learning Match identity attributes prediction=+1 point
- Credential I.D. Number—Machine learning Non-match identity attributes prediction=−1 point Credential Issuance Date—GAD match Credential issuance date=+1 point
Credential Issuance Date—GAD non-match Credential issuance date=−1 point
Credential Expiration Date—GAD match Credential expiration date=+1 point
Credential Expiration Date—GAD non-match Credential expiration date=−1 point
Credential Logo—GAD match for Credential unique logo=+1 point
Credential Logo—GAD non-match for Credential unique logo=−1 point
Credential Watermark—GAD match for Credential unique watermark=+1 point
Credential Watermark—GAD non-match for Credential unique watermark=−1 point It is worth noting that not all identity or credential attributes may be available for evaluation and scoring. An attribute that is not scored may receive a score of zero (0) points. Further, in some embodiments, one or more of the attributes being evaluated may have weighted scores, with values greater than one (+1) point and/or less than minus one (−1) point. At step 560, the individual scores for each set of attributes are further processed as a rich data set to generate data analytics to determine a final identity verification score, an output prediction and transaction labeling from the following three categories:

Assurance Level: Low, Medium, High
Credential Assessment: Valid, or Invalid
Transaction Continuity: Approved, or Disapproved At step 570, the final results are provided for delivery to the device of the signature authorizing agent for review and consideration with respect to the identity verification of the requester in the signature validated transaction. Example tables for providing the final results from the identity verification using training model 500 are shown here:

TABLE 1

Identity Attribute Metric Results

| Identity Attribute | GAD Match | Value |
|---|---|---|
| First Name | | |
| Last Name | | |
| Date of Birth | | |
| Name/Partial SSN# | | |
| ASSURANCE LEVEL | | |
| PREDICTIVE OUTPUT | | |
| (Assessment and Continuity) | | |

TABLE 2

Credential Attribute Metric Results

| Identity Credential | GAD Match | Value |
|---|---|---|
| Credential Holder Name | | |
| Credential Issuing Authority | | |
| Type Identification Credential | | |
| I.D. Number | | |
| Issuance Date | | |
| Expiration Date | | |
| Logo | | |
| Watermark | | |
| ASSURANCE LEVEL | | |
| PREDICTIVE OUTPUT | | |
| (Assessment and Continuity) | | |

It is worth noting that the predictive outputs from one or both of the identity attribute metric results in Table 1 and the credential attribute metric results in Table 2 may be used to generate the identity verification score, as described above. Further, the analysis may include a comparison of the identity verification score to a threshold value for the identity attribute verification score. For example, if at least 80% of the identity credentials evaluated in table 1 receive a value of +1, then the identity verification score has exceeded its threshold value and an electronic signature validation may be generated based on the results from training model 500.

In some embodiments, the same or similar MPL machine learning technique as described in training model 500 may be applied for generating and determining a jurisdiction validity score for prediction and decision using a similar training model as described above. Validation of jurisdiction is often necessary or important, often in order to establish which law or sets of law may govern the signature validated transaction. In many jurisdictions, laws require that only certain individuals registered with that jurisdiction may act as a signature validation agent or notary. For example, some state jurisdictions in the United States require that property wills and e-wills can only be validly notarized by a notary licensed in the state of domicile of the domicile or residence of the testator.

The parameters or attributes used to generate a jurisdiction validity score may include the type of notarial or signature validated transaction, the commissioning jurisdiction for the notary or signature validation agent, and the jurisdictional domicile or residence of the signer. In some cases, the attributes may be extracted from documents (e.g., identification image, answers to questions) received from the signer as well records associated with the notary or signature validation agent. In addition, relevant reference inputs from GADs or other relevant databases may also be input to the scoring module and integrated with the attributes. These inputs may include, but are not limited to, jurisdictions or states that have enacted legislation for online signature validation such as RON, jurisdictions or states that have enacted legislation for online validation of certain electronic transactions, such as e-wills, and the like.

The training model, as part of the learning portion of the machine learning technique implemented in the AI processing circuit, may first identify whether the jurisdiction for the notary or signature validation agent is governed by specific rules for remote online signature validated transactions for the particular transaction that is being validated. Expectations and predictions may be adjusted through the model to accommodate differences in scoring as a result. Otherwise, as has been described above, the AI processing circuit initiates supervised classification algorithms to categorize results from jurisdiction attribute processing. The algorithms calculate jurisdiction attribute metric values for each of the set of attributes associated with the signer and the signature validation agent or notary. The metric values may plus one (+1) point or minus one (−1) point and may further be weighted, as described above, based on the model. The metric values for the set of attributes are further processed as a rich data set to generate data analytics to determine a final jurisdiction validity score along with an output prediction and transaction labeling from three categories as described above. For example, the processing may include a comparison of the jurisdiction validity score to a threshold value for the jurisdiction validity score, such as at least 80% of the evaluated jurisdiction scores receiving a value of +1. If the jurisdiction validity score exceeds its threshold value, then an electronic signature validation may be generated based on the results of the training model.

In some embodiments, the same or similar MPL machine learning technique as described in training model 500 may be applied for generating and determining a venue validity score for prediction and decision using a similar training model as described above. The venue differs from the jurisdiction in that the venue covers or is governed by more localized rules or procedures as they pertain to certain transactions, including signature validated transactions. In some cases the venue is the location (e.g., a, county or city) where the signature validated transaction (e.g., a will) or document notarization will be recorded as opposed to the jurisdiction, which is a larger geographic region (e.g., a state) under which the signature authorizing agent (e.g., the notary public) is permitted or licensed to execute the transaction. In other words, venue is the location where the signer "appeared" before the signature authorizing agent. Depending on the rules of the jurisdiction, the venue must be considered as part of the permissible jurisdiction for the signature authorizing agent. For example, some state jurisdictions in the United States require that real estate transactions and property deeds can only be validly notarized by a notary licensed in the state of domicile of the property associated with the city or county where the property is located.

The parameters or attributes used to generate a venue validity score may include selection of jurisdiction by signer, type of signature validation transaction or electronic document, and commissioning jurisdiction of the signature agent or notary. In some cases, the attributes may be extracted from documents (e.g., electronic document, answers to questions) received from the signer as well records associated with the notary or signature validation agent. In addition, relevant reference inputs from GADs or other relevant databases may also be input to the scoring module and integrated with the attributes. These inputs may include, but are not limited to, jurisdictions or states that have enacted legislation for online signature validation such as RON, jurisdictions or states that have enacted legislation for online validation of certain electronic transactions, such as electronic real estate transactions, electronic recordation of property deeds, and the like.

The training model, as part of the learning portion of the machine learning technique implemented in the AI processing circuit, initiates supervised classification algorithms to categorize results from venue attribute processing. The algorithms calculate venue attribute metric values for attributes associated with the venue where the signer appeared in front of the signature authorizing agent or notary. The metric values may be plus one (+1) point or minus one (−1) point and may further be weighted, as described above, based on the model. The values for each of the attributes are further processed as described above to determine a final venue validity score along with an output prediction and transaction labeling from three categories.

In some embodiments, the same or similar MPL machine learning technique as described in training model 500 may be applied for generating and determining a legal compliance score for prediction and decision using a similar training model as described above. In some jurisdictions, the form, format, and wording of the certificate affixed to or accompanying the signature of the agent or notary is very important to validating a signature authorized transaction, such as an electronic document. For instance, in the United States, the notary certificate consists of, or requires the venue, specific wording for notarization including specific wording associated with the electronic document or transaction, a properly made and positioned signature, and a seal.

The parameters or attributes used to generate a legal compliance score may include the venue associated with the transaction, the jurisdiction associated with the transaction, the wording that has been included on the electronic document, the electronic signature of the signature authorized agent, and the seal used by the signature authorized agent. In some cases, the attributes may be extracted documents (e.g., electronic documents) received from the signer as well records associated with the notary or signature validation agent. In addition, relevant reference inputs from GADs or other relevant databases may also be input to the scoring module and integrated with the attributes. These inputs may include, but are not limited to, laws, statutes, rules, or procedures associated with signature validated transactions or notarizations in the appropriate venues and/or jurisdictions, and the like. It is worth noting that if the generation of the legal compliance score is used in conjunction with the generation of the jurisdiction validity score and/or the venue validity score described above, information used to generate one or both of those scores may be used as well.

The training model, as part of the learning portion of the machine learning technique implemented in the AI processing circuit, initiates supervised classification algorithms to categorize results from signature authorization or notary certificate attribute processing. The algorithms calculate legal compliance attribute metric values in order to assess the expected validity of the authorization. The metric values may be plus one (+1) point or minus one (−1) point and may further be weighted, as described above, based on the model. The values for each of the attributes are further processed as described above to determine a final signature authorization or notary certificate validity score along with an output prediction and transaction labeling that characterize validity into one or more categories. For instance, the characterization may determine venue, wording, signature, and seal scores for a notary certificate, assess against a set of predictions, and calculate a final decision for "approve" or "decline" or "redo" status.

In some embodiments, the same MPL machine learning technique and process 500 may be applied for generating and determining a request routing score for prediction and decision using a similar training model as described above. The request routing score may be used in conjunction with selection of an appropriate signature authorized agent or notary for a particular signature authorized transaction based on the initial request made by a signer or end user.

The parameters or attributes used to generate a request routing score may include the commissioning jurisdiction of the signature authorized agent and the federated status of the signature authorized agent. In some cases, the attributes may be extracted from records associated with the notary or signature validation agent and available in the clearinghouse. In addition, relevant reference inputs from GADs or other relevant databases may also be input to the scoring module and integrated with the attributes. These inputs may include, but are not limited to, jurisdictions or states that have enacted legislation for online signature validation such as RON, jurisdictions or states that allow or have enacted legislation to recognized federated signature validation, licensing records in jurisdictions or states associated with the signature validated agent or notary, and the like. It is worth noting that each individual signature authorized agent or notary's attributes may be entered and evaluated individually, or the model may be modified to include all, or a subset of the signature authorized agents or notaries registered in the clearinghouse database.

The training model, as part of the learning portion of the machine learning technique implemented in the AI processing circuit, initiates supervised classification algorithms to categorize results from request routing attribute processing. The algorithms calculate request routing attribute metric values in order to assess the expected validity of the authorization. The metric values may be plus one (+1) point or minus one (−1) point and may further be weighted, as described above, based on the model. The values for each of the attributes are further processed in a manner similar to described above to determine a final request routing score along with an output prediction and transaction labeling that characterize the validity. The final output may include a rating for each signature authorized agent and/or may provide a recommendation of a particular signature authorized agent or notary depending on how the attributes were processed as mentioned above.

It is worth noting that the request for routing attribute metric values, request touring scores, and/or the ratings for each signature authorized agent or registered in the clearinghouse database may further be used to determine what types of secured transactions each can perform. For example, the clearinghouse database may classify notaries into three notary designations. The designations are non-federated, in which notaries may only provide services in the commissioning State, federated in which notaries may provide services outside of the commissioning State, and international in which foreign notaries may provide services in the commissioning Country. The designations may then be included in the recommendation and selection mechanism for a signature authorized agent or notary. For instance, the selection mechanism used as part of the generation of a request routing score when a request for notarizing a will may support the objectives of a testator by systematically "disallowing" federated remote online Notaries from notarizing electronic wills thus eliminating venue ambiguity.

The embodiments described herein are solely for the purpose of illustration. Those in the art will recognize that other embodiments may be practiced with modifications and alterations limited only by the claims. Further, it is to be appreciated that, except where explicitly indicated in the description above, the various features shown and described can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for a system and method for distributed on-line transactions utilizing a clearinghouse, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method for performing a distributed online transaction in a clearinghouse device, the method comprising:

establishing a secure connection over a communication network between a network interface in a clearinghouse device and (i) a network interface in a user device and (ii) a network interface in a signature authorizing agent device based on a request from the user device, the secure connection used for signature validation of an electronic file representing a document as part of a signature validated transaction associated with a user;

generating, by a processor in the clearinghouse device, a first random set of user identification elements to be provided from a plurality of user identification elements available, the first random set of user identification elements including an identification image and at least one additional identification attribute, the identification image including at least one jurisdiction attribute;

receiving, from the user device over the secure connection, information for the first random set of user identification elements at the network interface in the clearinghouse device;

applying, using the processor in the clearinghouse device, at least one machine learning technique to generate a first identity attribute verification score comparing the information related to the first random set of user identification elements to available data stored in a database, the at least one machine learning technique including generating an identification credential metric, including a jurisdiction metric using a location associated with the requested signature validation transaction and the at least one jurisdiction attribute, as part of the first identity attribute verification score, the jurisdiction metric determined by applying at least one machine learning technique to generate a jurisdiction verification metric using a training model associated with a jurisdiction attribute identified from the identification image;

applying, using the processor in the clearinghouse device, the at least one machine learning technique to generate a second random subset of user identification elements and generating a second identity attribute verification score if the identification credential metric is below a first predetermined threshold in a credentials database;

providing, through the network interface in the clearinghouse device, one of the first identity attribute verification score and the second identity attribute verification score to the signature authorizing agent device;

applying, using the processor in the clearinghouse device, at least one machine learning technique to generate a legal compliance score for the signature validated transaction using at least one of a signature authorization certificate and a notarial seal which is associated with a jurisdiction of the signature authorizing agent and providing the legal compliance score to the signature authorizing agent device;

applying, using the processor in the clearinghouse device, at least one machine learning technique to generate a venue validity score by applying at least one machine learning technique to generate a venue verification metric using a training model associated with the location of the signature authorized transaction and a database of venues and providing the venue validity score to the signature authorizing agent device over the secure connection; and amending the electronic file representing the document by attaching an electronic signature validation to the electronic file using the processor in the clearinghouse device if (i) the identification credential metric is above the first predetermined threshold, (ii) the legal compliance score is above a second predetermined threshold, and (iii), the venue validity score is above a third predetermined threshold, the electronic signature validation associated with the signature authorizing agent for the signature validated transaction;

the training model for the at least one machine learning technique updated based on an evaluation of at least one of the first random set of user identification elements and the second random set of user identification elements.

2. The method of claim 1, wherein the signature authorizing agent for the signature validated transaction is at least one of a notary public, a required witness of a document, and a government official having responsibility for certification of a document.

3. The method of claim 1, wherein the identification image includes at least one of a driver's license, a government issued identification card, and a passport.

4. The method of claim 1, wherein the identification credential metric is generated using a training model associated with at least one credential attribute from the identification image, the at least one credential attribute including at least one of a jurisdiction of issue, an address for the cardholder, a birthdate for the cardholder, an identification number, an expiration date, a hologram, and a cardholder photo.

5. The method of claim 1, wherein the applying at least one machine learning technique to generate a first identity verification score further includes generating an identity validation metric using a training model associated with the identification image and a series of answers provided from the user device to questions that are generated as part of the at least one machine learning technique to generate the identity verification score.

6. The method of claim 1, further comprising establishing a secure connection over a communication network between the clearinghouse device and the credentials database.

7. The method of claim 1, wherein the first random set of user identification elements and the second random set of user identification elements are determined using a pseudo-random computer selection process.

8. An apparatus configured as a clearinghouse device, the apparatus comprising:
a network interface that is configured to establish a secure connection over a communication network with a user device and with a signature authorizing agent device based on a request from a user device, the secure connection used for signature validation of an electronic file representing a document as part of a signature validated transaction associated with a user;
a processor coupled to the network interface, the processor generating a first random set of user identification elements to be provided from a plurality of user identification elements available, the first random set of user identification elements including an identification image and at least one additional identification attribute, the identification image including at least one jurisdiction attribute; the processor receiving from the user device over the secure connection, information for the first random set of identification elements; and
an artificial intelligence engine that applies at least one machine learning technique to generate a first identity attribute verification score comparing the information related to the first random set of user identification elements to available data stored in a database, the at least one machine learning technique including generating an identification credential metric, including a jurisdiction metric using a location associated with the requested signature validation transaction and the at least one jurisdiction attribute, as part of the first identity attribute verification score, the jurisdiction metric determined by applying at least one machine learning technique in the artificial intelligence engine to generate a jurisdiction verification metric using a training model associated with a jurisdiction attribute identified from the identification image, the artificial intelligence engine further applying the at least one machine learning technique to generate a second random subset of user identification elements and generating a second identity attribute verification score if the identification credential metric is below a first predetermined threshold in a credentials database, the artificial intelligence engine further applying at least one machine learning technique to generate a legal compliance score for the signature validated transaction using at least one of a signature authorization certificate and a notarial seal which is associated with a jurisdiction of the signature authorizing agent and applying at least one machine learning technique to generate a venue validity score, the at least one machine learning technique including generating a venue verification metric using a training model associated with the location of the signature authorized transaction and a database of venues;

the processor further providing the legal compliance score, the venue validity score, and one of the first identity attribute verification score and the second identity attribute verification score to the network interface for communication to the signature authorizing agent device over the secure connection and amends the electronic file representing the document by attaching an electronic signature validation to the electronic file if (i) the identification credential metric is above the first predetermined threshold, (ii) the legal compliance score is above a second predetermined threshold, and (iii), the venue validity score is above a third predetermined threshold, the electronic signature validation associated with the signature authorizing agent for the signature validated transaction;

the training model for the at least one machine learning technique updated based on an evaluation of at least one of the first random set of user identification elements and the second random set of user identification elements.

9. The apparatus of claim 8, wherein the identification credential metric is generated using a training model associated with at least one credential attribute from the identification image, the at least one credential attribute including at least one of a jurisdiction of issue, an address for the cardholder, a birthdate for the cardholder, an identification number, an expiration date, a hologram, and a cardholder photo.

10. The apparatus of claim 8, wherein the artificial intelligence engine applies the at least one machine learning technique to generate an identity attribute verification score using a training model associated with the identification image and a series of answers provided from the user device to questions that are generated as part of the at least one machine learning technique to generate the identity verification score.

11. A system comprising:
an end user device that includes a network interface and a processor for facilitating a signature authorization request for a signature validated transaction;
a signature authorization agent device that includes a network interface and a processor for facilitating a signature authorization activity for the signature validated transaction; and a clearinghouse device that includes a network interface, a processor, and an artificial intelligence engine, the clearinghouse device configured to:

establish a secure connection over a communication network with a user device and with a signature authorizing agent device based on a request from the user device, the secure connection used for signature validation of an electronic file representing a document as part of a signature validated transaction associated with a user;

generate a first random set of user identification elements to be provided from a plurality of user identification elements available, the first random set of user identification elements including an identification image and at least one additional identification attribute, the identification image including at least one jurisdiction attribute;

receive, from the user device over the secure connection, information for the first random set of user identification elements;

apply at least one machine learning technique to generate a first identity attribute verification score comparing the information related to the first random set of user identification elements to available data stored in a database, the at least one machine learning technique including generating an identification credential metric, including a jurisdiction metric using a location associated with the requested signature validation transaction and the at least one jurisdiction attribute, as part of the first identity attribute verification score, the jurisdiction metric determined by applying at least one machine learning technique to generate a jurisdiction verification metric using a training model associated with a jurisdiction attribute identified from the identification image;

apply the at least one machine learning technique to generate a second random subset of user identification elements and generating a second identity attribute verification score if the identification credential metric is below a first predetermined threshold in a credentials database apply at least one machine learning technique, using the processor in the clearinghouse device, to generate a legal compliance score for the signature validated transaction using at least one of a signature authorization certificate and a notarial seal which is associated with a jurisdiction of the signature authorizing agent and providing the legal compliance score to the signature authorizing agent device;

apply at least one machine learning technique, using the processor in the clearinghouse device, to generate a venue validity score by applying at least one machine learning technique to generate a venue verification metric using a training model associated with the location of the signature authorized transaction and a database of venues and providing the venue validity score to the signature authorizing agent device over the secure connection;

provide one of the first identity attribute verification score and the second identity attribute verification score to the signature authorizing agent device over the secure connection; and amend the electronic file representing the document by attaching an electronic signature validation to the electronic file if (i) the identification credential metric is above the first predetermined threshold in the credentials database, (ii) the legal compliance score is above a second predetermined threshold, and (iii), the venue validity score is above a third predetermined threshold, the electronic signature validation associated with the signature authorizing agent for the signature validated transaction;

the training model for the at least one machine learning technique updated based on an evaluation of at least one of the first random set of user identification elements and the second random set of user identification elements.

12. A non-transitory computer readable medium carrying instructions in the form of program code that, when executed on one or more processors:

establishes secure connection over a communication network between a clearinghouse device and (i) a user device and (ii) a signature authorizing agent device based on a request from the user device, the secure connection used for signature validation of an electronic file representing a document as part of a signature validated transaction associated with a user;

generates a first random set of user identification elements to be provided from a plurality of user identification elements available, the first random set of user identification elements including an identification image and at least one additional identification attribute, the identification image including at least one jurisdiction attribute;

receives, from the user device over the secure connection, information for the first random set of user identification elements;

applies at least one machine learning technique to generate a first identity attribute verification score comparing the information related to the first random set of user identification elements to available data stored in a database, the at least one machine learning technique including generating an identification credential metric, including a jurisdiction metric using a location associated with the requested signature validation transaction and the at least one jurisdiction attribute, as part of the first identity verification score, the jurisdiction metric determined by applying at least one machine learning technique to generate a jurisdiction verification metric using a training model associated with a jurisdiction attribute identified from the identification image;

applies the at least one machine learning technique to generate a second random set of user identification elements and generating a second identity attribute verification score if the identification credential metric is below a first predetermined threshold in a credentials database;

applies at least one machine learning technique to generate a legal compliance score for the signature validated transaction using at least one of a signature authorization certificate and a notarial seal which is associated with a jurisdiction of the signature authorizing agent and providing the legal compliance score to the signature authorizing agent device:

applies at least one machine learning technique to generate a venue validity score by applying at least one machine learning technique to generate a venue verification metric using a training model associated with the location of the signature authorized transaction and a database of venues and providing the venue validity score to the signature authorizing agent device over the secure connection; and provides one of the first identity attribute verification score and the second identity attribute verification score to the signature authorizing agent device over the secure connection; and amends the electronic file representing the document by attaching an electronic signature validation to the electronic file if (i) the identification credential metric is above a first predetermined threshold in the credential database, (ii) the legal compliance score is above a second predetermined threshold, and (iii), the venue validity score is above a third predetermined threshold, the electronic signature validation association with the signature authorizing agent for the signature validated transaction;

the training model for the at least one machine learning technique updated based on an evaluation of at least one of the first random set of user identification elements and the second random set of user identification elements.

\* \* \* \* \*